United States Patent
Burrowes et al.

(10) Patent No.: US 7,056,250 B2
(45) Date of Patent: Jun. 6, 2006

(54) POWER TRANSMISSION BELT CONTAINING SHORT HIGH MOLECULAR WEIGHT POLYACRYLONITRILE FIBER

(75) Inventors: Thomas George Burrowes, Lincoln, NE (US); Carol Sue Hedberg, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 211 days.

(21) Appl. No.: 10/413,263

(22) Filed: Apr. 14, 2003

(65) Prior Publication Data

US 2004/0204275 A1    Oct. 14, 2004

(51) Int. Cl.
 *F16G 1/04* (2006.01)
(52) U.S. Cl. .................... 474/263; 474/237
(58) Field of Classification Search .............. 474/237, 474/252, 263
See application file for complete search history.

(56) References Cited

U.S. PATENT DOCUMENTS

| 5,272,198 A | 12/1993 | Kaminski et al. ........... 524/426 |
| 5,376,726 A | 12/1994 | Noyama et al. ............. 525/193 |
| 5,889,080 A | 3/1999 | Kaminski et al. ........... 523/156 |
| 6,358,171 B1 * | 3/2002 | Whitfield .................... 474/266 |
| 6,753,363 B1 * | 6/2004 | Harashina .................... 524/99 |

FOREIGN PATENT DOCUMENTS

| EP | 490706 | 6/1992 |
| EP | 562642 | 9/1993 |
| EP | 1108750 | 6/2001 |

OTHER PUBLICATIONS

European Search Report.
"Baypren® 116", Bayer Corporation, Product Specification.
"CTF 525 High Strength Technical Fiber", Sterling Fibers, Inc., Technical Fact Sheet.
"Technical/Industrial Fibers", Sterling Fibers, Inc.
"Technora, High Tenacity Aramid Fiber", Teijin.
"Teijinconex, Heat Resistant Aramid Fiber", Teigin.

* cited by examiner

*Primary Examiner*—Vicky A. Johnson
(74) *Attorney, Agent, or Firm*—John D. DeLong

(57) ABSTRACT

An endless power transmission belt having
 (1) a tension section;
 (2) a cushion section; and
 (3) a load-carrying section disposed between said tension section and cushion section; and the belt containing an elastomeric composition comprising
  (a) cross-linked elastomer; and
  (b) from 1 to 50 phr of high molecular weight polyacrylonitrile fiber.

17 Claims, 1 Drawing Sheet

POWER TRANSMISSION BELT CONTAINING SHORT HIGH MOLECULAR WEIGHT POLYACRYLONITRILE FIBER

BACKGROUND OF THE INVENTION

U.S. Pat. No. 5,272,198 discloses a fiber-reinforced material comprising an elastomer and microdenier acrylic fibers with a small diameter up to about 12 microns.

U.S. Pat. No. 5,376,726 discloses a short fiber-reinforced rubber wherein a fibrillated polyacrylonitrile short fiber is uniformly dispersed in a rubber, and a process for producing the same.

U.S. Pat. No. 5,889,080 discloses a method for making a dry blend in the preparation of a friction material, wherein the components thereof include fibrillated, organic, synthetic polymer; organic synthetic polymer staple; and organic, synthetic polymer particles.

SUMMARY OF THE INVENTION

The present invention relates to a power transmission belt that is characterized by a free radically or sulfur cured elastomeric composition comprising a crosslinked rubber and from 1 to 50 phr of high molecular weight polyacrylonitrile staple fiber.

BRIEF DESCRIPTION OF THE FIGURES

The accompanying figure shows embodiments of this invention in which.

DETAILED DESCRIPTION OF THE INVENTION

There is disclosed an endless power transmission belt having
(1) a tension section;
(2) a cushion section; and
(3) a load-carrying section disposed between said tension section and cushion section; and the belt containing an elastomeric composition comprising
(a) a cross-linked rubber; and
(b) from 1 to 50 phr of short high molecular weight polyacrylonitrile staple fiber.

The present invention relates to a new and improved power transmission belt. The power transmission belt of the present invention may be embodied in accordance with the two conventional type of designs of power transmission belt. In the first design, the cushion section is reinforced with high molecular weight polyacrylonitrile staple fiber. In the second design, the load carrying and/or tension section is reinforced with high molecular weight polyacrylonitrile staple fiber.

Figure 1:
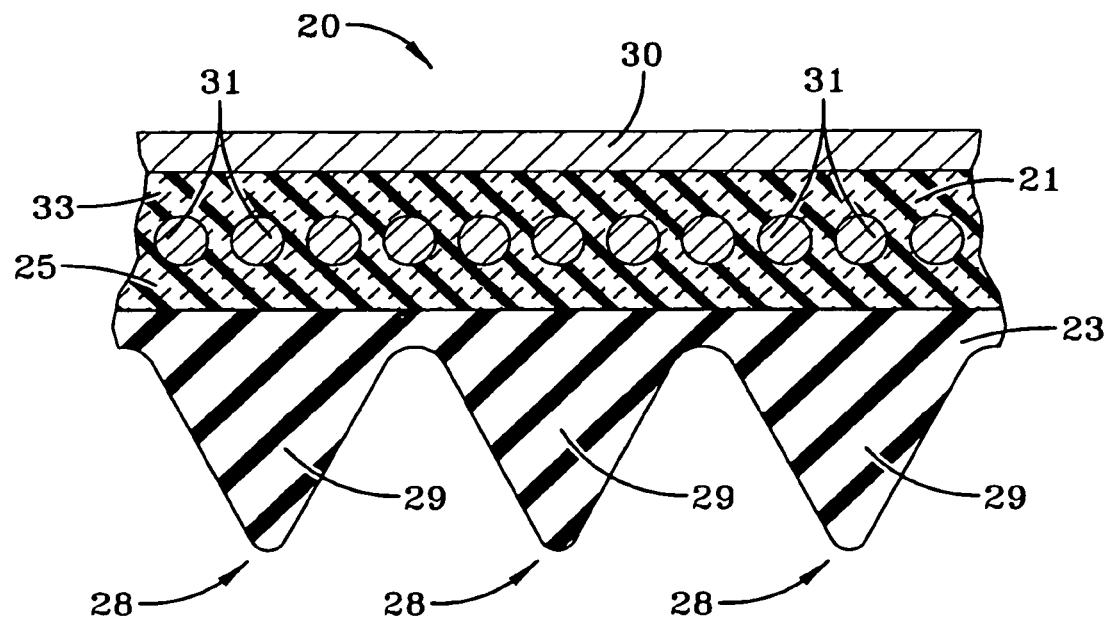
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may have the drive surface 28 comprising multiple ribs 29 or Vs. The belt 20 of FIG. 1 has a fabric backing 30, however, in lieu of a fabric backing, a fiber-loaded rubber may be used. The fabric backing 30 may be bi-directional, non-woven, woven or knitted fabric. The fabric backing layer 30 may be frictioned, dipped, spread, coated or laminated.

The load carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. Preferably, the belt 20 has one drive surface.

The elastomeric compositions for use in the tension section 21, cushion section 22 and load carrying section 23 may be the same or different.

The elastomeric composition for use in the tension section 21, load carrying section 23 and/or cushion section 22 contains a cross-linked elastomer or rubber. Such rubber may be selected from the group consisting of ethylene alpha-olefin rubber, silicone rubber, polychloroprene, polybutadiene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, and mixtures thereof. In alternate embodiments, the rubbers are EPDM, hydrogenated acrylonitrile rubber, natural rubber, polybutadiene or styrene-butadiene rubber. In other alternate embodiments, the elastomeric composition comprises styrene-butadiene rubber and natural rubber or polybutadiene and natural rubber.

The ethylene alpha-olefin elastomer includes copolymers composed of ethylene and propylene units (EPM), ethylene and butene units, ethylene and pentene units or ethylene and octene units (EOM) and terpolymers composed of ethylene and propylene units and an unsaturated component (EPDM), ethylene and butene units and an unsaturated component, ethylene and pentene units and an unsaturated component, ethylene and octene units and an unsaturated component, as well as mixtures thereof. As the unsaturated component of the terpolymer, any appropriate non-conjugated diene may be used, including, for example, 1,4-hexadiene, dicyclopentadiene or ethylidenenorbornene (ENB). The ethylene alpha-olefin elastomer preferred in the present invention contains from about 35 percent by weight to about 90 percent by weight of the ethylene unit, from about 65 percent by weight to about 5 percent by weight of the propylene or octene unit and 0 to 10 percent by weight of the unsaturated component. In a more preferred embodiment, the ethylene alpha-olefin elastomer contains from about 50 percent to about 70 percent by weight of the ethylene unit and, in a most preferred embodiment, the ethylene alpha-olefin elastomer contains from about 55 percent to about 75 percent of the ethylene unit. The most preferred ethylene alpha-olefin elastomer is EPDM.

The cross-linked elastomeric composition contains from 1 to 50 phr of short high molecular weight polyacrylonitrile fiber. In another embodiment, from 1 to 20 phr of high molecular weight polyacrylonitrile fiber are present. In another embodiment, from 1 to 10 phr of high molecular weight polyacrylonitrile fiber are present. The cross-linked elastomer containing the high molecular weight polyacrylonitrile fiber may be used in the tension section, load carrying section and/or cushion section.

The elastomeric composition contains a staple high molecular weight polyacrylontrile fiber. By "high molecular weight" is meant a weight average molecular weight of at least about 150,000. By "staple" it is meant that the fibers are not fibrillated, and have a generally constant cross section that may be substantially round or non-round. Preferably, the staple fiber is an acrylic staple fiber having 1) additives to increase thermal stability, or 2) high modulus/high molecular weight with a minimum modulus of 5.5 GPa and a minimum weight average molecular weight of 150,000.

The fibers useful herein may contain additives such as cyanoguanidine (DICY), metal salts, N-substituted malimides, etc. to enhance thermal stability.

Suitable high molecular weight polyacrylonitrile staple fibers may be produced from polymers having an acrylonitrile content of at least 85% (based on weight of acrylonitrile monomer content to total monomer content of the pre-polymerization mixture). Suitable fibers may also be made from polymers having an acrylonitrile content in excess of about 89%. Suitable comonomers may comprise methyl methacrylate or vinyl acetate which may be present at levels of approximately 8.5%, by weight.

Another suitable high molecular weight polyacrylonitrile staple fiber is that produced from a random bicomponent fiber made from a 50/50 mixture of a 90/10 acrylonitrile/methyl methacrylate or vinyl acetate copolymer and a 93/7 acrylonitrile/methyl methacrylate or vinyl acetate copolymer. Other comonomers may be used. Compatibility of such other monomers can easily be determined by one skilled in the art by simple experimentation. Alternatively, the acrylic fiber can be homopolymer.

Suitable high molecular weight polyacrylonitrile staple fiber components may be crimped or non-crimped.

Suitable high molecular weight polyacrylonitrile staple fiber will have a modulus of 5.5 GPa to 16.5 GPa, a number average molecular weight of 150,000 to 500,000 and a specific gravity of 1.1 to 1.2. Suitable fiber will have a diameter in a range of from about 5 to about 15 microns, and a length of from about 0.5 to about 15 mm.

One suitable high molecular weight staple polyacrylonitrile fiber is available as CTF 525 from Sterling Fibers, Inc. CTF 525 has typical physical properties as given in the following table:

TABLE A

Typical Physical Properties
CTF525 Polyacrylonitrile Staple Fiber

| Color | Cream |
| --- | --- |
| Cross Section | Approximately Round |
| Density | about 1.18 gm/cm$^3$ |
| Length | about 0.5–10 mm |
| Diameter | about 12 microns |
| Denier | about 1.2 dtex (1.1 denier) |
| Tensile Strength | about 1100 MPa |
| Modulus | about 13.8 GPa |
| Elongation | about 12% |

The elastomeric composition containing the cross-linked elastomer and high molecular weight polyacrylonitrile staple fiber may be used in the tension section 21, cushion section 23, and/or load carrying sections 22 of the belt. Preferably, the elastomeric composition is used in the cushion section 23.

The elastomeric compositions containing the high molecular weight polyacrylonitrile staple fiber may be cross-linked by sulfur, UV cure or peroxide cure system. Well known classes of peroxides that may be used include diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5 -trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, α,α'-bis(t-butylperoxy)diisopropylbenzene, di-t-butyl peroxide, 2,5-dimethyl-2,5-di(t-butylperoxy) hexane-3, t-butyl perbenzoate, 4-methyl-4-t-butylperoxy-2-pentanone and mixtures thereof. The preferred peroxide is α,α'-bis(t-butylperoxy) diisopropylbenzene. Typical amounts of peroxide ranges from 1 to 12 phr (based on active parts of peroxide). Preferably, the amount of peroxide ranges from 2 to 6 phr.

A co-agent is present during the free radical crosslinking reaction. Co-agents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof. The co-agent may be present in a range of levels. Generally speaking, the co-agent is present in an amount ranging from 0.1 to 40 phr. Preferably, the co-agent is present in an amount ranging from 2 to 15 phr.

As mentioned above, one class of co-agents are acrylates and methacrylates. Representative examples of such co-agents include di-, tri-, tetra- and penta-functional acrylates, di-, tri-, tetra- and penta-functional methacrylates and mixtures thereof. Specific examples of such co-agents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris (2-hydroxy ethyl) isocyanurate triacrylate, tris (2-hydroxy ethyl) isocyanurate triacrylate, and tris (2-hydroxy ethyl) isocyanurate trimethacrylate.

The metal salts of α,β-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. Zinc diacrylate and zinc dimethacrylate are preferred.

The elastomeric composition for use in the coating layer may be cured with a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. The amount of sulfur-vulcanizing agent will vary depending on the remaining ingredients in the coating and the particular type of sulfur-vulcanizing agent that is used. Generally speaking, the amount of sulfur-vulcanizing agent ranges from about 0.1 to about 8 phr with a range of from about 1.0 to about 3 being preferred.

Accelerators may be used to control the time and/or temperature required for vulcanization of the coating. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Conventional carbon blacks may also be present in the composition. Such carbon blacks are used in conventional amounts ranging from 5 to 250 phr. Preferably, the carbon blacks are used in an amount ranging from 20 to 100 phr. Representative examples of carbon blacks which may be used include those known by their ASTM designations N110, N121, N242, N293, N299, S315, N326, N330, M332, N339, N343N347, N351, N358, N375, N550, N582, N630, N624, N650, N660, N683, N754, N762, N907, N908, N990, N991 and mixtures thereof.

It is readily understood by those having skill in the art that the rubber composition would be compounded by methods generally known in the rubber compounding art, such as mixing the various constituent rubbers with various commonly-used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about 0 to 80 parts, and preferably about 10 to 20 parts, by weight based on 100 parts of rubber. Other non-carbon black fillers may also be used, including but not limited to clay, exfoliated clay, talcs, mica, calcium carbonate, starch, and wood flour.

In addition to the chopped high molecular weight polyacrylonitrile staple fibers, the elastomer composition may also contain additional fibers or flock. The optional fibers or flock to be distributed throughout the elastomer mix may be any suitable material and is preferably non-metallic fibers such as cotton or fibers made of a suitable synthetic material include aramid, nylon, polyester, PTFE, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 1 to 50 phr.

In addition to the above, solid inorganic lubricants may be present in the elastomer composition. Representative examples of such lubricants include molybdenum disulfide, PTFE, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

Figure 2:
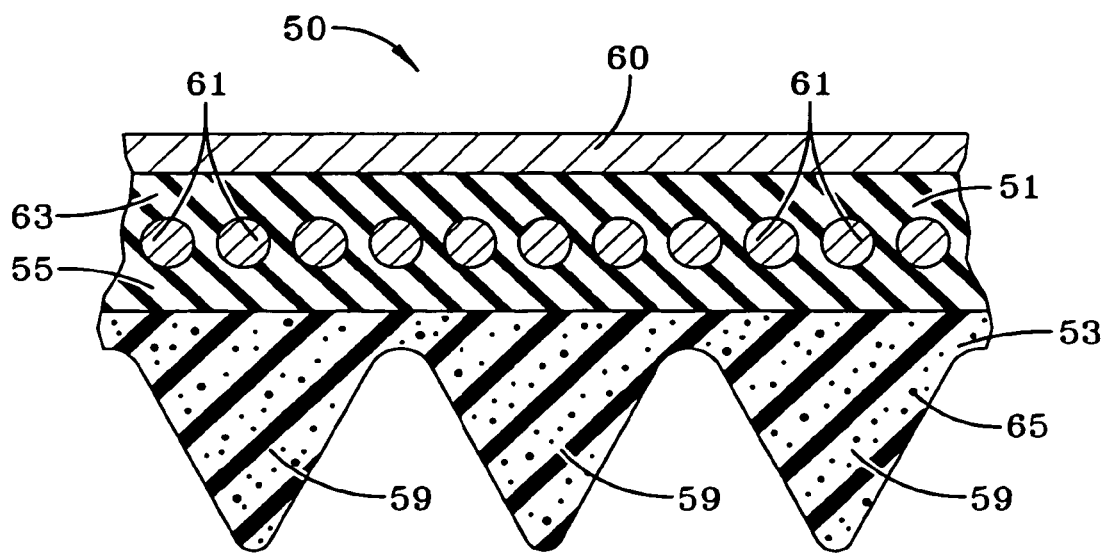
FIG. 2 is a fragmentary perspective view illustrating one embodiment of an endless power transmission belt of this invention.

Referring to FIG. 2, there is shown an endless power transmission belt 50 according to another embodiment. Similar to the belt 20 of FIG. 1, the belt 50 comprises a tension section 51, a cushion section 53 and a load-carrying section 55 disposed between the tension section 51 and cushion section 53. The belt 50 of FIG. 1 has a plurality of ribs 59 or Vs and a fabric backing 60. The load carrying section 55 has load-carrying means in the form of load-carrying cords 61 or filaments which are embedded in an elastomeric matrix 63. The elastomeric compound located in the cushion section 53 is illustrated as containing high molecular weight polyacrylonitrile staple fiber 65.

As known to those skilled in the art, power transmission belts may be built on a drum device. First, the backing is applied to drum as a sheet. Next, any tension section is applied as a sheet followed by spiraling onto the drum the cord or tensile members (load-carrying section). Thereafter, the cushion section is applied and followed by the fabric, if used. The assembled laminate or slab and drum are placed in a mold and cured. After cure, ribs are cut into the slab and the slab cut into belts in a manner known to those skilled in the art.

The invention is further illustrated by the following non-limiting examples.

EXAMPLES

In the following examples, physical tests were conducted for uncured and molded compounds. Properties of the vulcanized rubbers were measured according to the following test protocols: MDRs by ASTM D5289-95; hardness by ASTM D2240- 97; specific gravity by ASTM D297-93; tear die C strength by ASTM D624-98; tensile properties by ASTM D412-98a; with the modification that the rate of grip separation was 152 mm per minute to accommodate the fiber loading of the belts (see U.S. Pat. No. 5,610,217); and dynamic testing data by ASTM D5992-96. The fiber orientation was assessed by the ratio of the physical properties in the "with" direction (machine direction) to the physical properties in the "against direction" (perpendicular to the machine direction).

Rubber compositions containing the materials set out in Tables 1–3 were prepared in a BR Banbury™ mixer using two separate stages of addition (mixing); namely one non-productive mix stage and one productive mix stage. Samples also contained conventional compounding ingredients, e.g., processing oil, sulfur or peroxide, stearic acid, zinc oxide, antidegradants, and accelerator(s), in addition to the ingredients in Tables 1–3. The compositions within each Example were identical except for the presence of chopped fibers as indicated in Tables 1–3.

The samples were cured at 151° C. or 171° C. for about 20–30 minutes where appropriate. The samples tested for their dynamic properties were cured an additional 15 minutes.

Example 1

Comparison of HMW PAN and Aramid in EPDM

In this example, high molecular weight polyacrylonitrile fiber (Sample 3) was evaluated in a peroxide-cured EPDM rubber compound. Control samples 1, 2, and 4 included various conventional chopped aramid fibers.

TABLE 1

| | Sample No. | | | |
|---|---|---|---|---|
| | 1 | 2 | 3 | 4 |
| EPDM[1] | 86.7 | 86.7 | 86.7 | 86.7 |
| Carbon Black[2] | 40 | 40 | 40 | 40 |
| Aramid chopped fiber[3] | 8.5 | 0 | 0 | 0 |
| Aramid chopped fiber[4] | 0 | 8.5 | 0 | 0 |
| HMW polyacrylic chopped fiber[5] | 0 | 0 | 8.5 | 0 |
| Aramid chopped fiber[6] | 0 | 0 | 0 | 8.5 |
| MDR 3.0/191° C. | | | | |
| Test Temperature (° C.) | 191 | 191 | 191 | 191 |
| Test Time (min) | 3 | 3 | 3 | 3 |
| $M_L$ (dNm) | 1.03 | 1.13 | 1.14 | 1.07 |
| $M_H$ (dNm) | 22.20 | 22.84 | 22.74 | 23.29 |
| $T_{s1}$ (min) | 0.31 | 0.30 | 0.32 | 0.31 |
| $T_{90}$ (min) | 1.43 | 1.48 | 1.47 | 1.45 |
| S' at $T_{90}$ (dNm) | 20.08 | 20.67 | 20.58 | 21.07 |
| Rheometer (dNm/min) | 52.43 | 53.59 | 53.00 | 54.05 |
| MDR 30/171.1° C. | | | | |
| Test Temperature (° C.) | 171 | 171 | 171 | 171 |
| Test Time (min) | 30 | 30 | 30 | 30 |

TABLE 1-continued

|  | Sample No. | | | |
|---|---|---|---|---|
|  | 1 | 2 | 3 | 4 |
| $M_L$ (dNm) | 1.06 | 1.17 | 1.14 | 1.10 |
| $M_H$ (dNm) | 27.87 | 28.15 | 28.10 | 28.87 |
| $T_{s1}$ (min) | 0.63 | 0.64 | 0.68 | 0.66 |
| $T_{90}$ (min) | 9.45 | 9.51 | 10.00 | 9.84 |
| S' at $T_{90}$ (dNm) | 25.19 | 25.45 | 25.40 | 26.09 |
| Rheometer (dNm/min) | 11.83 | 12.18 | 11.23 | 11.51 |
| RPA Temperature Sweep | | | | |
| S' at 82.2° C. (N-m) | 0.762 | 0.818 | 0.862 | 0.853 |
| S' at 93.3° C. (N-m) | 0.583 | 0.640 | 0.660 | 0.654 |
| S' at 115.6° C. (N-m) | 0.379 | 0.429 | 0.435 | 0.427 |
| S' at 126.6° C. (N-m) | 0.311 | 0.354 | 0.360 | 0.350 |
| S' at 132.2° C. (N-m) | 0.288 | 0.327 | 0.337 | 0.321 |
| S' at 137.8° C. (N-m) | 0.297 | 0.332 | 0.338 | 0.320 |
| Tan. Delta at 82.2° C. | 0.718 | 0.698 | 0.686 | 0.718 |
| Tan. Delta at 93.3° C. | 0.811 | 0.779 | 0.756 | 0.796 |
| Tan. Delta at 115.6° C. | 0.974 | 0.927 | 0.876 | 0.952 |
| Tan. Delta at 126.6° C. | 1.041 | 0.992 | 0.940 | 1.020 |
| Tan. Delta at 132.2° C. | 1.071 | 1.024 | 0.968 | 1.052 |
| Tan. Delta at 137.8° C. | 1.059 | 1.021 | 0.965 | 1.052 |
| Hardness Shore A | | | | |
| Hardness (Shore A) | 86 | 85 | 86 | 87 |
| Specific Gravity | | | | |
| Specific Gravity | 1.137 | 1.141 | 1.131 | 1.142 |
| Tear Strength, Die C - Against | | | | |
| Peak Stress (kN/m) | 46.986 | 38.977 | 48.300 | 43.379 |
| Break Stress (kN/m) | 46.205 | 37.963 | 46.845 | 42.343 |
| Tear Strength, Die C - With | | | | |
| Peak Stress (kN/m) | 37.864 | 36.515 | 42.285 | 42.257 |
| Break Stress (kN/m) | 14.834 | 15.041 | 19.715 | 25.603 |
| Tear Strength, Die B - Against | | | | |
| Peak Stress (kN/m) | 61.413 | 58.781 | 65.848 | 59.644 |
| Break Stress (kN/m) | 61.047 | 58.326 | 65.113 | 59.026 |
| Tear Strength, Die B - With | | | | |
| Peak Stress (kN/m) | 66.100 | 65.246 | 68.560 | 61.465 |
| Break Stress (kN/m) | 64.468 | 53.680 | 67.867 | 58.370 |
| Tensile Test $T_{10}$ (6 inch/min) - Against | | | | |
| Tensile (MPa) | 9.447 | 10.197 | 9.080 | 9.670 |
| Elongation (%) | 261.000 | 273.000 | 195.000 | 235.000 |
| 5% Modulus (MPa) | 0.805 | 0.816 | 0.814 | 0.922 |
| 10% Modulus (MPa) | 1.262 | 1.264 | 1.369 | 1.358 |
| 15% Modulus (MPa) | 1.624 | 1.618 | 1.768 | 1.675 |
| 20% Modulus (MPa) | 1.919 | 1.890 | 2.104 | 1.979 |
| 25% Modulus (MPa) | 2.214 | 2.135 | 2.415 | 2.241 |
| 50% Modulus (MPa) | 3.583 | 3.195 | 3.809 | 3.586 |
| 100% Modulus (MPa) | 5.561 | 5.262 | 5.963 | 5.889 |
| 200% Modulus (MPa) | 8.065 | 8.525 | 0 | 8.698 |
| 300% Modulus (MPa) | 0 | 0 | 0 | 0 |
| 400% Modulus (MPa) | 0 | 0 | 0 | 0 |
| Tensile Test $T_{10}$ (6 inch/min) - With | | | | |
| Tensile (MPa) | 12.629 | 9.533 | 11.998 | 13.561 |
| Elongation (%) | 39.000 | 73.000 | 43.000 | 25.000 |
| 5% Modulus (MPa) | 3.301 | 1.760 | 3.234 | 3.551 |
| 10% Modulus (MPa) | 5.511 | 3.176 | 5.155 | 6.536 |
| 15% Modulus (MPa) | 8.012 | 4.453 | 7.553 | 9.842 |
| 20% Modulus (MPa) | 10.452 | 5.572 | 9.895 | 11.456 |
| 25% Modulus (MPa) | 12.040 | 6.667 | 11.034 | 0 |
| 50% Modulus (MPa) | 0 | 9.447 | 0 | 0 |
| 100% Modulus (MPa) | 0 | 0 | 0 | 0 |
| 200% Modulus (MPa) | 0 | 0 | 0 | 0 |
| 300% Modulus (MPa) | 0 | 0 | 0 | 0 |
| 400% Modulus (MPa) | 0 | 0 | 0 | 0 |
| Dynamic Properties - 0° C. | | | | |
| Dynamic Stiffness | | | | |
| 10 Hz (kN/m) | 1078.374 | 1043.724 | 1088.432 | 1073.378 |
| 20 Hz (kN/m) | 1124.850 | 1097.020 | 1128.314 | 1113.220 |

TABLE 1-continued

|  | Sample No. | | | |
|---|---|---|---|---|
|  | 1 | 2 | 3 | 4 |
| 30 Hz (kN/m) | 1140.195 | 1128.090 | 1154.660 | 1142.086 |
| 40 Hz (kN/m) | 1156.961 | 1143.156 | 1180.740 | 1160.140 |
| 50 Hz (kN/m) | 1174.353 | 1164.658 | 1184.323 | 1181.462 |
| 60 Hz (kN/m) | 1187.018 | 1191.194 | 1203.286 | 1192.914 |
| 70 Hz (kN/m) | 1207.420 | 1211.110 | 1215.032 | 1205.740 |
| 80 Hz (kN/m) | 1220.500 | 1211.522 | 1232.307 | 1235.937 |
| 90 Hz (kN/m) | 1234.489 | 1216.852 | 1238.799 | 1253.775 |
| Tan. Delta | | | | |
| 10 Hz | 0.194 | 0.198 | 0.193 | 0.208 |
| 20 Hz | 0.190 | 0.195 | 0.186 | 0.204 |
| 30 Hz | 0.195 | 0.197 | 0.190 | 0.206 |
| 40 Hz | 0.197 | 0.197 | 0.189 | 0.209 |
| 50 Hz | 0.200 | 0.197 | 0.192 | 0.210 |
| 60 Hz | 0.201 | 0.198 | 0.194 | 0.212 |
| 70 Hz | 0.199 | 0.197 | 0.192 | 0.213 |
| 80 Hz | 0.199 | 0.196 | 0.191 | 0.212 |
| 90 Hz | 0.195 | 0.192 | 0.188 | 0.208 |
| Total Energy | | | | |
| 10 Hz (J) | 0.313 | 0.309 | 0.315 | 0.335 |
| 20 Hz (J) | 0.324 | 0.323 | 0.319 | 0.344 |
| 30 Hz (J) | 0.334 | 0.335 | 0.330 | 0.354 |
| 40 Hz (J) | 0.339 | 0.337 | 0.333 | 0.359 |
| 50 Hz (J) | 0.349 | 0.343 | 0.339 | 0.363 |
| 60 Hz (J) | 0.353 | 0.350 | 0.343 | 0.369 |
| 70 Hz (J) | 0.355 | 0.355 | 0.345 | 0.375 |
| 80 Hz (J) | 0.354 | 0.348 | 0.340 | 0.374 |
| 90 Hz (J) | 0.349 | 0.341 | 0.340 | 0.379 |
| Dynamic Properties - 130° C. | | | | |
| Dynamic Stiffness | | | | |
| 10 Hz (kN/m) | 665.938 | 674.724 | 544.988 | 671.737 |
| 20 Hz (kN/m) | 703.819 | 704.007 | 565.042 | 700.840 |
| 30 Hz (kN/m) | 725.313 | 725.051 | 578.263 | 726.382 |
| 40 Hz (kN/m) | 741.612 | 742.707 | 589.048 | 747.563 |
| 50 Hz (kN/m) | 755.423 | 760.507 | 597.883 | 764.334 |
| 60 Hz (kN/m) | 766.922 | 774.600 | 614.465 | 778.002 |
| 70 Hz (kN/m) | 771.652 | 783.555 | 624.324 | 785.939 |
| 80 Hz (kN/m) | 765.376 | 788.793 | 631.598 | 782.126 |
| 90 Hz (kN/m) | 771.683 | 785.086 | 628.255 | 784.130 |
| Tan. Delta | | | | |
| 10 Hz | 0.191 | 0.176 | 0.150 | 0.170 |
| 20 Hz | 0.203 | 0.190 | 0.161 | 0.190 |
| 30 Hz | 0.213 | 0.202 | 0.173 | 0.207 |
| 40 Hz | 0.215 | 0.210 | 0.180 | 0.219 |
| 50 Hz | 0.217 | 0.214 | 0.185 | 0.225 |
| 60 Hz | 0.216 | 0.218 | 0.197 | 0.230 |
| 70 Hz | 0.214 | 0.215 | 0.198 | 0.226 |
| 80 Hz | 0.209 | 0.215 | 0.204 | 0.218 |
| 90 Hz | 0.207 | 0.206 | 0.189 | 0.205 |
| Total Energy | | | | |
| 10 Hz (J) | 0.190 | 0.178 | 0.123 | 0.171 |
| 20 Hz (J) | 0.215 | 0.202 | 0.138 | 0.201 |
| 30 Hz (J) | 0.232 | 0.221 | 0.152 | 0.226 |
| 40 Hz (J) | 0.238 | 0.232 | 0.159 | 0.242 |
| 50 Hz (J) | 0.244 | 0.242 | 0.166 | 0.254 |
| 60 Hz (J) | 0.245 | 0.252 | 0.181 | 0.264 |
| 70 Hz (J) | 0.243 | 0.248 | 0.184 | 0.260 |
| 80 Hz (J) | 0.235 | 0.249 | 0.188 | 0.249 |
| 90 Hz (J) | 0.232 | 0.238 | 0.176 | 0.234 |

[1] Royalene 580HT
[2] Sterling NS-1
[3] T320 1.5 denier
[4] TEIJIN CONEX
[5] Sterling CTF525
[6] T320 .75 denier

Example 2

Comparison of HMW PAN and Aramid in Neoprene

In this example, high molecular weight chopped polyacrylonitrile staple fiber was evaluated in a polychloroprene rubber compound, and compared with similar compounds containing conventional aramid chopped fibers.

TABLE 2

|  | Sample No. | | | |
| --- | --- | --- | --- | --- |
|  | 5 | 6 | 7 | 8 |
| Polychloroprene[1] | 100 | 100 | 100 | 100 |
| Carbon black[2] | 40 | 40 | 40 | 40 |
| Cotton flock[3] | 20 | 20 | 20 | 20 |
| Aramid fiber[4] | 4 | 0 | 2 | 1 |
| HMW acrylic fiber[5] | 0 | 4 | 2 | 3 |
| MDR 30/151.67° F. | | | | |
| Test Temperature (° F.) | 151.67 | 151.67 | 151.67 | 151.67 |
| Test Time (min) | 30 | 30 | 30 | 30 |
| $M_L$ (dNm) | 1.89 | 2.22 | 2.28 | 2.3 |
| $M_H$ (dNm) | 14.4 | 16.14 | 15.82 | 16.29 |
| $T_{s1}$ (min) | 2.71 | 2.52 | 2.71 | 2.51 |
| $T_{90}$, (min) | 25.6 | 25.23 | 25.37 | 25.15 |
| S' at $T_{90}$ (dNm) | 13.15 | 14.75 | 14.47 | 14.89 |
| Rheometer (dNm/min) | 0.64 | 0.69 | 0.65 | 0.69 |
| Hardness Shore A | | | | |
| Hardness (Shore A) | 81 | 85 | 84 | 84 |
| Specific Gravity | | | | |
| Specific Gravity | 1.407 | 1.375 | 1.387 | 1.381 |
| Tensile Test $T_{10}$ (6 inch/min) - Against | | | | |
| Tensile (MPa) | 8.06 | 8.11 | 7.93 | 8.03 |
| Elongation (%) | 322 | 296 | 312 | 295 |
| 5% Modulus (MPa) | 0.61 | 0.63 | 0.56 | 0.54 |
| 10% Modulus (MPa) | 1.03 | 1.09 | 1.02 | 1.00 |
| 15% Modulus (MPa) | 1.37 | 1.48 | 1.39 | 1.34 |
| 20% Modulus (MPa) | 1.64 | 1.80 | 1.68 | 1.64 |
| 25% Modulus (MPa) | 1.88 | 2.05 | 1.93 | 1.89 |
| 50% Modulus (MPa) | 2.69 | 2.69 | 2.69 | 2.63 |
| 100% Modulus (MPa) | 3.42 | 3.24 | 3.27 | 3.25 |
| 200% Modulus (MPa) | 5.01 | 5.36 | 5.07 | 5.21 |
| 300% Modulus (MPa) | 7.70 | 0.00 | 7.87 | 0.00 |
| 400% Modulus (MPa) | 0 | 0 | 0 | 0 |
| Tensile Test $T_{10}$ (6 inch/min) - With | | | | |
| Tensile (MPa) | 10.94 | 11.41 | 11.31 | 11.17 |
| Elongation (%) | 339 | 333 | 332 | 334 |
| 5% Modulus (MPa) | 2.67 | 3.58 | 3.92 | 3.93 |
| 10% Modulus (MPa) | 5.08 | 6.41 | 6.66 | 6.62 |
| 15% Modulus (MPa) | 6.90 | 7.86 | 7.79 | 7.70 |
| 20% Modulus (MPa) | 7.61 | 7.72 | 7.68 | 7.61 |
| 25% Modulus (MPa) | 7.71 | 7.23 | 7.15 | 7.11 |
| 50% Modulus (MPa) | 6.38 | 6.05 | 5.98 | 6.13 |
| 100% Modulus (MPa) | 5.98 | 5.96 | 5.92 | 5.88 |
| 200% Modulus (MPa) | 6.38 | 6.66 | 6.71 | 6.65 |
| 300% Modulus (MPa) | 9.99 | 10.54 | 10.59 | 10.24 |
| 400% Modulus (MPa) | 0.00 | 0.00 | 0.00 | 0.00 |
| Dynamic Properties Room Temperature | | | | |
| Dynamic Stiffness | | | | |
| 10 Hz (kN/m) | 1142.39 | 1441.88 | 1436.73 | 1512.44 |
| 20 Hz (kN/m) | 1185.35 | 1482.33 | 1485.19 | 1536.25 |
| 30 Hz (kN/m) | 1207.33 | 1505.87 | 1521.72 | 1546.05 |
| 40 Hz (kN/m) | 1222.54 | 1523.63 | 1544.03 | 1554.08 |
| 50 Hz (kN/m) | 1234.16 | 1550.75 | 1538.41 | 1558.53 |
| 60 Hz (kN/m) | 1246.57 | 1568.15 | 1566.56 | 1557.80 |
| 70 Hz (kN/m) | 1256.58 | 1585.81 | 1581.96 | 1557.34 |
| 80 Hz (kN/m) | 1263.14 | 1582.55 | 1592.30 | 1556.49 |
| Tan.Delta | | | | |
| 10 Hz | 0.227 | 0.247 | 0.262 | 0.230 |

TABLE 2-continued

|  | Sample No. | | | |
|---|---|---|---|---|
|  | 5 | 6 | 7 | 8 |
| 20 Hz | 0.233 | 0.250 | 0.271 | 0.228 |
| 30 Hz | 0.236 | 0.252 | 0.275 | 0.227 |
| 40 Hz | 0.242 | 0.257 | 0.282 | 0.232 |
| 50 Hz | 0.246 | 0.260 | 0.291 | 0.236 |
| 60 Hz | 0.250 | 0.259 | 0.291 | 0.238 |
| 70 Hz | 0.251 | 0.261 | 0.289 | 0.239 |
| 80 Hz | 0.256 | 0.267 | 0.293 | 0.243 |
| Total Energy | | | | |
| 10 Hz (J) | 0.158 | 0.216 | 0.227 | 0.214 |
| 20 Hz (J) | 0.168 | 0.225 | 0.241 | 0.215 |
| 30 Hz (J) | 0.174 | 0.231 | 0.252 | 0.217 |
| 40 Hz (J) | 0.177 | 0.234 | 0.256 | 0.217 |
| 50 Hz (J) | 0.180 | 0.237 | 0.261 | 0.219 |
| 60 Hz (J) | 0.184 | 0.238 | 0.264 | 0.219 |
| 70 Hz (J) | 0.185 | 0.241 | 0.264 | 0.218 |
| 80 Hz (J) | 0.185 | 0.243 | 0.261 | 0.219 |
| Dynamic Properties 93.33° F. | | | | |
| Dynamic Stiffness | | | | |
| 10 Hz (kN/m) | 903.72 | 958.81 | 992.34 | 1034.99 |
| 20 Hz (kN/m) | 927.38 | 985.44 | 1018.42 | 1048.82 |
| 30 Hz (kN/m) | 933.64 | 982.11 | 1033.72 | 1051.64 |
| 40 Hz (kN/m) | 940.13 | 1000.79 | 1047.40 | 1064.81 |
| 50 Hz (kN/m) | 948.13 | 1007.81 | 1063.00 | 1084.29 |
| 60 Hz (kN/m) | 956.33 | 1025.67 | 1074.55 | 1103.51 |
| 70 Hz (kN/m) | 968.43 | 1031.90 | 1087.84 | 1113.06 |
| 80 Hz (kN/m) | 973.94 | 1043.66 | 1093.21 | 1126.41 |
| Tan.Delta | | | | |
| 10 Hz | 0.206 | 0.218 | 0.239 | 0.229 |
| 20 Hz | 0.208 | 0.221 | 0.245 | 0.230 |
| 30 Hz | 0.208 | 0.224 | 0.246 | 0.232 |
| 40 Hz | 0.211 | 0.227 | 0.255 | 0.237 |
| 50 Hz | 0.215 | 0.235 | 0.254 | 0.240 |
| 60 Hz | 0.216 | 0.242 | 0.262 | 0.242 |
| 70 Hz | 0.217 | 0.243 | 0.261 | 0.241 |
| 80 Hz | 0.220 | 0.246 | 0.265 | 0.245 |
| Total Energy | | | | |
| 10 Hz (J) | 0.113 | 0.127 | 0.144 | 0.144 |
| 20 Hz (J) | 0.118 | 0.132 | 0.151 | 0.146 |
| 30 Hz (J) | 0.119 | 0.135 | 0.154 | 0.149 |
| 40 Hz (J) | 0.120 | 0.137 | 0.159 | 0.151 |
| 50 Hz (J) | 0.123 | 0.141 | 0.161 | 0.155 |
| 60 Hz (J) | 0.124 | 0.148 | 0.166 | 0.159 |
| 70 Hz (J) | 0.124 | 0.148 | 0.166 | 0.158 |
| 80 Hz (J) | 0.124 | 0.149 | 0.166 | 0.160 |
| F-43 | | | | |
| Pilling (Rating Scale) | 3.25 | 3.75 | 5* | 3.75 |
| F-42 | | | | |
| Abrasion (%) | 2.01% | 2.24% | 1.78% | 1.97% |
| F-32 | | | | |
| Edge Cord (hours) | 311.25 | 311.75 | 304 | 302.75 |
| W-55 | | | | |
| Belt Life (hours) | 175.25 | 167.67 | 173.5 | 151.5 |

[1]Baypren 116
[2]N-550
[3]AKROFLOCK
[4]TEIJIN CONEX
[5]CTF525

Example 3

Comparison of HMW PAN and LMW PAN in SBR/NR

In this example, high molecular weight polyacrylonitrile fiber was evaluated in a sulfur-cured styrene-butadiene and natural rubber compound and compared with similar compounds containing conventional low molecular weight polyacrylonitrile chopped fibers.

TABLE 3

| | Sample No. | | |
|---|---|---|---|
| | 9 | 10 | 11 |
| Styrene-butadiene rubber[1] | 70 | 70 | 70 |
| Natural Rubber[2] | 30 | 30 | 30 |
| Carbon black[3] | 25 | 25 | 25 |
| Silica[4] | 20 | 20 | 20 |
| HMW acrylic fiber[5] | 8 | 0 | 0 |
| LMW acrylic fiber[6] | 0 | 8 | 0 |
| LMW acrylic fiber[7] | 0 | 0 | 8 |
| MDR 3.0/191° C. | | | |
| Test Temperature (° C.) | 191 | 191 | 191 |
| Test Time (min) | 3 | 3 | 3 |
| $M_L$ (dNm) | 1.41 | 1.49 | 1.54 |
| $M_H$ (dNm) | 14.65 | 13.96 | 14.27 |
| $T_{s1}$ (min) | 0.52 | 0.53 | 0.53 |
| $T_{90}$ (min) | 1.84 | 1.89 | 1.91 |
| S' at $T_{90}$ (dNm) | 13.33 | 12.7 | 12.99 |
| Rheometer (dNm/min) | 11.1 | 10.42 | 10.6 |
| MDR 30/151.7° C. | | | |
| Test Temperature (° C.) | 151.7 | 151.7 | 151.7 |
| Test Time (min) | 30 | 30 | 30 |
| $M_L$ (dNm) | 1.82 | 1.92 | 1.96 |
| $M_H$ (dNm) | 18.36 | 17.75 | 17.97 |
| $T_{s1}$ (min) | 5.31 | 5.43 | 5.59 |
| $T_{90}$ (min) | 18.43 | 19.1 | 19.34 |
| S' at $T_{90}$ (dNm) | 16.7 | 16.16 | 16.35 |
| Rheometer (dNm/min) | 1.88 | 1.69 | 1.72 |
| MDR 30/171.1° C. | | | |
| Test Temperature (° C.) | 171.1 | 171.1 | 171.1 |
| Test Time (min) | 30 | 30 | 30 |
| $M_L$ (dNm) | 1.63 | 1.63 | 1.66 |
| $M_H$ (dNm) | 16.66 | 15.8 | 15.92 |
| $T_{s1}$ (min) | 1.4 | 1.49 | 1.53 |
| $T_{90}$ (min) | 5.42 | 5.72 | 5.65 |
| S' at $T_{90}$ (dNm) | 15.15 | 14.38 | 14.5 |
| Rheometer (dNm/min) | 4.81 | 4.21 | 4.28 |
| RPA Temperature Sweep | | | |
| S' at 82.2° C. (Nm) | 0.768 | 0.754 | 0.775 |
| S' at 93.3° C. (Nm) | 0.642 | 0.629 | 0.652 |
| S' at 115.6° C. (Nm) | 0.485 | 0.489 | 0.509 |
| S' at 126.6° C. (Nm) | 0.424 | 0.432 | 0.453 |
| S' at 132.2° C. (Nm) | 0.398 | 0.409 | 0.428 |
| S' at 137.8° C. (Nm) | 0.375 | 0.384 | 0.405 |
| Tan.Delta at 82.2° C. | 0.642 | 0.592 | 0.594 |
| Tan.Delta at 93.3° C. | 0.662 | 0.631 | 0.633 |
| Tan.Delta at 115.6° C. | 0.702 | 0.673 | 0.667 |
| Tan.Delta at 126.6° C. | 0.734 | 0.693 | 0.686 |
| Tan.Delta at 132.2° C. | 0.743 | 0.705 | 0.698 |
| Tan.Delta at 137.8° C. | 0.736 | 0.707 | 0.695 |
| Hardness Shore A | | | |
| Hardness (Shore A) | 78 | 72 | 72 |
| Specific Gravity | | | |
| Specific Gravity | 1.203 | 1.192 | 1.185 |
| Tear Strength, Die C - Against | | | |
| Peak Stress (kN/m) | 38.14 | 31.92 | 34.28 |
| Break Stress (kN/m) | 36.95 | 31.88 | 34.28 |
| Tear Strength, Die C - With | | | |
| Peak Stress (kN/m) | 39.31 | 32.46 | 34.00 |
| Break Stress (kN/m) | 24.73 | 24.62 | 26.07 |
| Tensile Test $T_{10}$ (6 inch/min) - Against | | | |
| Peak Stress (MPa) | 12.52 | 14.47 | 14.50 |
| Peak Strain (%) | 411 | 444 | 433 |
| Break Stress (MPa) | 12.51 | 14.46 | 14.49 |
| Elongation (%) | 411 | 444 | 434 |
| 5% Modulus (MPa) | 0.58 | 0.57 | 0.49 |
| 10% Modulus (MPa) | 0.83 | 0.78 | 0.71 |
| 15% Modulus (MPa) | 1.03 | 0.94 | 0.89 |
| 20% Modulus (MPa) | 1.19 | 1.08 | 1.03 |
| 25% Modulus (MPa) | 1.31 | 1.19 | 1.15 |
| 50% Modulus (MPa) | 1.74 | 1.60 | 1.57 |
| 100% Modulus (MPa) | 2.37 | 2.31 | 2.30 |
| 200% Modulus (MPa) | 4.91 | 5.11 | 5.14 |
| 300% Modulus (MPa) | 8.42 | 8.91 | 8.86 |
| 400% Modulus (MPa) | 12.05 | 12.78 | 12.68 |
| Tensile Test $T_{10}$ (6 inch/min) - With | | | |
| Peak Stress (MPa) | 16.42 | 16.37 | 16.19 |
| Peak Strain (%) | 440 | 433 | 426 |
| Break Stress (MPa) | 16.42 | 16.37 | 16.19 |
| Elongation (%) | 440 | 433 | 426 |
| 5% Modulus (MPa) | 1.88 | 0.84 | 0.95 |
| 10% Modulus (MPa) | 2.89 | 1.23 | 1.37 |
| 15% Modulus (MPa) | 3.47 | 1.51 | 1.66 |
| 20% Modulus (MPa) | 3.52 | 1.70 | 1.85 |
| 25% Modulus (MPa) | 3.43 | 1.84 | 1.95 |
| 50% Modulus (MPa) | 3.28 | 2.16 | 2.24 |
| 100% Modulus (MPa) | 3.74 | 2.98 | 3.08 |
| 200% Modulus (MPa) | 6.81 | 6.52 | 6.57 |
| 300% Modulus (MPa) | 10.69 | 10.72 | 10.62 |
| 400% Modulus (MPa) | 14.63 | 15.06 | 14.80 |
| MTS DC-ARP | | | |
| Temperature: 79.4° C. | | | |
| Dynamic Stiffness (K*) | | | |
| 10 Hz (kN/m) | 493.08 | 450.44 | 452.06 |
| 20 Hz (kN/m) | 517.13 | 473.74 | 479.33 |
| 30 Hz (kN/m) | 526.44 | 482.10 | 488.55 |
| 40 Hz (kN/m) | 540.21 | 488.93 | 496.56 |
| 50 Hz (kN/m) | 548.26 | 495.79 | 498.95 |
| 60 Hz (kN/m) | 562.95 | 504.40 | 506.88 |
| 70 Hz (kN/m) | 564.80 | 507.30 | 512.89 |
| 80 Hz (kN/m) | 566.60 | 512.62 | 518.59 |
| Tan.Delta | | | |
| 10 Hz | 0.242 | 0.236 | 0.230 |
| 20 Hz | 0.238 | 0.232 | 0.227 |
| 30 Hz | 0.235 | 0.229 | 0.225 |
| 40 Hz | 0.238 | 0.225 | 0.221 |
| 50 Hz | 0.238 | 0.225 | 0.220 |
| 60 Hz | 0.239 | 0.221 | 0.217 |
| 70 Hz | 0.238 | 0.219 | 0.218 |
| 80 Hz | 0.239 | 0.221 | 0.222 |

[1] PLIOFLEX 1502
[2] SMR5L
[3] N-550
[4] HI-SIL (R) 243LD
[5] CTF525
[6] CTF395
[7] Mini Fiber Inc AEES4, 1.5 den, 1 mm The data of Example 3 demonstrate that a higher dynamic stiffness is obtained for rubber compositions containing the high molecular weight polyacrylonitrile staple fiber. High values of dynamic stiffness are desirable in a belt compound as dynamic stiffness is a good predictor of belt roll over resistance. The data further demonstrate a higher modulus at low extensions in the direction substantially parallel to the fiber orientation, for samples containing the high molecular weight polyacrylonitrile staple fiber. Thus, similar modulus values at low extension are obtainable in belts made using the high molecular weight polyacrylonitrile fiber using less fiber than is required for a lower molecular weight polyacrylonitrile. In other words, at equal fiber loading levels, samples containing high molecular weight polyacrylonitrile fiber show a higher dynamic stiffness, modulus, and hardness than samples similarly loaded with low molecular weight polyacrylonitrile. Likewise, for equivalent physical properties, a lower loading of the high molecular weight fiber is required versus the low molecular weight fiber. This can lead to a significant cost savings considering the high cost of fibers relative to other components of the rubber composition. Samples made with the high molecular weight fiber may also have superior compression set resistance and be more resistant to shear forces in mixing, calendaring, extruding, and molding than the lower molecular weight polyacrylonitrile fibers. Further, compound made with the high molecular weight fibers may be easier to orient on processing through equipment such as calendars and extruders than compounds made with low molecular weight polyacrylonitrile.

What is claimed is:

1. An endless power transmission belt having
   (1) a tension section;
   (2) a cushion section; and
   (3) a load-carrying section disposed between said tension section and cushion section, and the belt containing an elastomeric composition comprising
      (a) a cross-linked rubber selected from the group consisting of ethylene alpha-olefin elastomer, hydrogenated acrylonitrile rubber, natural rubber, polybutadiene, polychloroprene and styrene-butadiene rubber; and
      (b) from 1 to 50 phr of high molecular weight polyacrylonitrile staple fiber having a modulus of 5.5 GPa to 16.5 GPa, a number average molecular weight of 150,000 to 500,000, a specific gravity of 1.1 to 1.2, a diameter in a range of from about 5 to about 15 microns, and a length of from about 0.5 to about 15 mm.

2. The endless power transmission belt of claim 1, wherein said high molecular weight polyacrylonitrile staple fiber has properties including a density of about 1.18 gm/cm$^3$, an average length of about 0.5 to about 10 mm, an average diameter of about 12 microns, an average denier of about 1.2 dtex (1.1 denier), a tensile strength of about 1100 MPa, a modulus of about 13.8 GPa, and an elongation of about 12%.

3. The endless power transmission belt of claim 1 wherein the elastomeric composition further comprises at least one additional chopped fiber selected from the group consisting of aramid, nylon, polyester, PTFE, fiberglass, and cotton.

4. The endless power transmission belt of claim 1 wherein the elastomeric composition further comprises a filler selected from carbon black, silica, clay, exfoliated clay, talc, mica, calcium carbonate, starch, and wood flour.

5. The endless power transmission belt of claim 1 wherein the elastomeric composition further comprises carbon black.

6. The endless power transmission belt of claim 1 wherein the amount of high molecular weight polyacrylonitrile staple fiber ranges from 1 to 20 phr.

7. The endless power transmission belt of claim 1 wherein said elastomer composition is in the cushion section of the belt.

8. The endless power transmission belt of claim 1 wherein said elastomer composition is in the load-carrying section of the belt.

9. The endless power transmission belt of claim 1 wherein said elastomer composition is in the tension section of the belt.

10. The endless power transmission belt of claim 1 wherein said elastomeric composition comprises EPDM.

11. The endless power transmission belt of claim 1 wherein said elastomeric composition comprises hydrogenated acrylonitrile rubber.

12. The endless power transmission belt of claim 1 wherein said elastomeric composition comprises styrene-butadiene rubber and natural rubber.

13. The endless power transmission belt of claim 1 wherein said elastomeric composition comprises polybutadiene and natural rubber.

14. The endless power transmission belt of claim 1 wherein said elastomeric composition comprises polychloroprene rubber.

15. The endless power transmission belt of claim 1 wherein said high molecular weight polyacrylonitrile staple fiber comprises an acrylonitrile content of at least 85 percent, based on weight of acrylonitrile monomer content to total monomer content of the pre-polymerization mixture.

16. The endless power transmission belt of claim 15, wherein the acrylonitrile content is in excess of 89 percent.

17. The endless power transmission belt of claim 15 wherein said high molecular weight polyacrylonitrile staple fiber further comprises about 8.5 percent by weight of methyl methacrylate or vinyl acetate as co-monomer.

* * * * *